United States Patent [19]

Roggeman et al.

[11] Patent Number: 5,614,579
[45] Date of Patent: *Mar. 25, 1997

[54] PROCESS FOR THE PREPARATION OF TAPERED COPOLYMERS VIA IN SITU DISPERSION

[75] Inventors: David M. Roggeman, North Royalton; James E. Hall, Mogadore, both of Ohio

[73] Assignee: Bridgestone Corporation, Tokyo, Japan

[*] Notice: The term of this patent shall not extend beyond the expiration date of Pat. No. 5,272,207.

[21] Appl. No.: 352,938

[22] Filed: Dec. 9, 1994

Related U.S. Application Data

[63] Continuation-in-part of Ser. No. 137,332, Oct. 18, 1993, which is a continuation-in-part of Ser. No. 995,118, Dec. 22, 1992, Pat. No. 5,331,035.

[51] Int. Cl.⁶ .................................................. C08K 3/02
[52] U.S. Cl. .................. 524/457; 524/461; 525/89; 525/250; 525/271; 525/314; 525/315; 525/316; 526/201
[58] Field of Search ..................... 524/457, 461; 525/89, 250, 271, 314, 315, 316; 526/201

[56] References Cited

U.S. PATENT DOCUMENTS

| | | | |
|---|---|---|---|
| 4,098,980 | 7/1978 | Markle et al. | 526/201 |
| 4,452,960 | 6/1984 | Throckmorton | 526/201 |
| 4,829,135 | 5/1989 | Gunesin et al. | 526/173 |
| 4,871,814 | 10/1989 | Gunesin et al. | 525/314 |
| 5,234,999 | 8/1993 | Tung et al. | 525/314 |
| 5,241,008 | 8/1993 | Hall | 525/314 |
| 5,272,207 | 12/1993 | Hall et al. | 525/89 |
| 5,331,035 | 7/1994 | Hall | 524/457 |

FOREIGN PATENT DOCUMENTS 0135168 3/1985 European Pat. Off. .

Primary Examiner—Peter D. Mulcahy
Attorney, Agent, or Firm—Frank J. Troy, Sr.

[57] ABSTRACT

A process is provided for the preparation of tapered copolymers by the nonaqueous dispersion polymerization of a mixture of 30 to 70% by weight of a conjugated diolefin monomer, preferably butadiene, and 30 to 70% by weight of a vinyl substituted aromatic monomer, preferably styrene, in a liquid hydrocarbon dispersion medium with an anionic initiator catalyst system in the presence of a block copolymeric dispersing agent. At least one block of the dispersing agent is prepared prior to the dispersion polymerization reaction and at least one block of the dispersing agent is prepared in situ during the dispersion copolymerization. The block of the dispersing agent that is prepared in situ has the polymer structure of the tapered copolymer.

5 Claims, No Drawings

PROCESS FOR THE PREPARATION OF TAPERED COPOLYMERS VIA IN SITU DISPERSION

CROSS-REFERENCE TO RELATED APPLICATION

This application is a continuation-in-part of copending application Ser. No. 08/137,332, filed Oct. 18, 1993 which is a continuation-in-part of Ser. No. 07/995,118, filed Dec. 22, 1992, now U.S. Pat. No. 5,331,035.

FIELD OF THE INVENTION

The present invention relates to an anionic tapered styrene-butadiene type rubber polymerization process conducted in a nonaqueous dispersion utilizing butadiene-type and styrene-type monomers and a dispersing agent formed in situ during polymerization.

BACKGROUND OF THE INVENTION

In many prior art nonaqueous dispersion polymerization systems, organic dispersing medium has been utilized having poor solvent properties for the polymer being produced. A dispersing agent was therefore utilized in the organic medium in order to disperse the polymer being formed throughout the medium. These dispersing agents or dispersants were generally polymeric materials such as block copolymers, random copolymers, or homopolymers as described in U.S. Pat. Nos. 4,098,980 and 4,452,960.

Styrene-butadiene rubbers (SBR) have generally been prepared in solvents in which SBR is soluble, however, only SBR's having a styrene content of less than 35% are soluble in hexane or other aliphatic solvents. These higher styrene content SBR polymers are not completely insoluble in the aliphatic solvents, and, in fact, are highly swollen in these solvents. However, SBR's having a styrene content greater than 35% necessarily have been polymerized in aromatic or cycloaliphatic solvents via solution polymerization.

The applicant first determined that certain pre-made dispersing agents can be utilized to conduct the nonaqueous dispersion polymerization production of SBR having a styrene content greater than 35% by weight in aliphatic dispersing medium such as hexane. In these first dispersion SBR studies, a single diblock polymer consisting of a short block (5–10% of total polymer) of hexane soluble polybutadiene and a long block (90–95% of total) of high styrene content SBR was prepared in the absence of a dispersing agent. Synthesis of this polymer structure in hexane resulted in either extremely viscous cements or the very undesirable phase separation. Although the dispersion process using a pre-made dispersant works well, it has one shortcoming from a practical or commercial scale up point of view. The dispersant must be prepared separately and stored for subsequent use in the polymerization process. Storage tank and transfer lines require a large capital expenditure and the synthesis of the dispersant and transfer time into the polymerization reactor results in higher production costs. It is therefore desirable to provide a dispersion polymerization process in which there is no need to store the dispersing agent prior to the commencement of the dispersion polymerization process.

It is an object of the present invention to provide a polymerization process to produce tapered copolymers of styrene and butadiene monomers in a nonaqueous dispersion into tapered copolymers having 30 to 70% by weight of vinyl aromatic hydrocarbon such as styrene in the presence of a dispersing agent prepared in situ, that is, during the polymerization reaction.

Such a nonaqueous dispersion polymerization process offers many advantages including improved stable dispersions, improved heat transfer, energy savings, high polymer concentrations in the reaction medium, increased production capacity, and the production of very high molecular weight tapered copolymers; and no need to store the dispersing agent prior to its use.

It is a further embodiment of the present invention that a stable dispersion of SBR can be made at styrene levels of 30 to 45% in the SBR in solvents of higher solubility using the in situ dispersion tapered copolymer process as compared to the in situ dispersion linear, random SBR copolymer process as shown in U.S. Pat. No. 5,331,035. Normally SBR having between a 30 to 35% styrene content is soluble in hexane. This new process extends the advantages of dispersion polymerization to a lower, unexpected styrene level.

SUMMARY OF THE INVENTION

In accordance with the present invention, a process is provided for the preparation of tapered copolymers by the nonaqueous dispersion polymerization of a mixture of 30 to 70% by weight of a conjugated diolefin monomer, preferably butadiene, and 30 to 70% by weight of a vinyl substituted aromatic monomer, preferably styrene, in a liquid hydrocarbon dispersion medium with an anionic initiator catalyst system in the presence of a block copolymeric dispersing agent. At least one block of the dispersing agent is prepared prior to the dispersion polymerization reaction and at least one block of the dispersing agent is prepared in situ during the dispersion copolymerization. The block of the dispersing agent that is prepared in situ has the polymer structure of the tapered copolymer.

DETAILED DESCRIPTION OF THE INVENTION

The copolymer rubbers prepared by the process of the instant invention are tapered copolymers formed by the copolymerization of a conjugated diene monomer and a vinyl substituted aromatic monomer.

The conjugated diene monomers utilized in the synthesis of such tapered copolymer rubbers generally contain from 4 to 12 carbon atoms. Diene monomers containing from 4 to 8 carbon atoms are generally preferred for commercial processes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Vinyl substituted aromatic monomers, also referred to as vinyl aromatic monomers (VAM) suitable for use in preparing the tapered copolymers of this invention include any vinyl or alpha-methyl vinyl aromatic compounds capable of being polymerized by an anionic initiator. Particularly useful monomers for this purpose are vinyl aryl and alpha-methylvinyl aryl compounds such as styrene, alpha-methylstyrene, vinyl toluene, vinyl naphthalene, alpha-methylvinyl toluene, vinyl diphenyl, and corresponding compounds in which the aromatic nucleus may have other alkyl derivatives up to a total of 8 carbon atoms. Certain vinyl substituted aromatic monomers are not suitable for use in this dispersion polymerization process because homopolymers of these monomers are soluble in linear alkane solvents such as hexane and their copolymers with diene are also soluble. A specific example of an unsuitable monomer type is tert-butyl styrene.

The preferred comonomers for use in the process of the present invention are styrene and butadiene for production of a tapered SBR copolymer. In the production of the tapered copolymers of the present invention, the vinyl substituted aromatic monomer contributed content ranges from 30 to 70% by weight; preferably 30 to 60% by weight and most preferably, 30 to 45% by weight, and the diene monomer contributed content ranges from 30 to 70% by weight, preferably 40 to 70% by weight, and most preferably, 55 to 70% by weight.

The tapered copolymers produced by the process of the present invention can be prepared from any combination of each of the aforementioned conjugated diene and vinyl aromatic monomers. While the following discussion relates to the production of tapered styrene-butadiene rubbers (SBR) from styrene and butadiene monomers, it is apparent that this discussion encompasses the use of any combination of the above-identified vinyl-substituted aromatic hydrocarbons and conjugated dienes. The SBR-type copolymers prepared by the process of the present invention have an average molecular weight of 0,000 to 2,500,000 preferably 75,000 to 500,000. In addition to the ability to make high molecular weight polymers possessing good hot tensile strength, these copolymers have good oil acceptance or extendibility, modulus, tensile strength and stability against heat and aging.

The solvents, also known as the dispersing medium, used in the present polymerization process are aliphatic hydrocarbons, such as cycloaliphatic, branched and linear aliphatic hydrocarbons, including butane, pentane, hexane, heptane, isopentane, octane, isooctane, nonane, cyclohexane, isohexane and the like and mixtures thereof. Solvents are employed within such a range as being necessary to maintain a dispersion state in said solvent and for properly controlling stability of a polymer dispersion. The insolubility of SBR in a solvent is a function of molecular weight of the polymer, temperature, and the solubility parameter, which is the square root of the cohesive energy density, that is;

solubility parameter $(s.p.) = \sqrt{\Delta E/V}$ wherein E is internal energy and V is the molar volume. For polymers, it is often best to calculate s.p. as displayed in the article "A Method for Estimating the Solubility Parameters and Molar Volumes of Liquids" in *Polymer Engineering & Science*, Vol. 14, No. 2, pp 147–154 (1974). The calculated s.p. is 8.6 for polybutadiene, 9.17 for a tapered SBR having a 30% styrene content, and 10.5 for polystyrene. The s.p. of n-hexane is 7.28 and a 30% styrene tapered SBR has only partial solubility in n-hexane. The solubility parameter (s.p.) of SBR or other random copolymer produced by the present invention is preferably at least about 1.9 greater than the s.p. of the solvent or dispersing medium, so that the tapered SBR is not completely soluble in the dispersing medium, thereby forming an acceptable dispersion.

The preferred solvent for use as a dispersing medium in the present process is n-hexane. While the solvent may consist of up to 100% of non-cyclic aliphatic hydrocarbons, preferably up to 70% of non-cyclic aliphatic hydrocarbons, up to 40% by weight of the total solvent can be provided by alicyclic hydrocarbons such as cyclopentane, methylcyclopentane, cyclohexane, methylcyclohexane and aromatic hydrocarbons such as benzene and toluene, or mixtures thereof. A higher percentage of VAM units in the tapered SBR allows for a higher percentage of alicyclic and aromatic hydrocarbons to be present in a solvent mixture. However, for a tapered SBR with approximately less than 45% styrene content, no more than 20% of the solvent should consist of one or more alicyclic hydrocarbons such as cyclohexane. The tapered copolymer product preferably contains 10 to 50% weight of solids relative to the liquid hydrocarbon dispersing medium to yield a fluid polymer dispersion that can be easily handled.

The copolymerization process of the present invention is performed in a nonaqueous dispersing medium in the presence of an anionic initiator catalyst system and a block copolymer dispersing agent that is prepared in situ during the copolymerization process. The block copolymer dispersing agents useful in the present invention are polyblock copolymers, in that they are selected from a variety of polymers containing at least two blocks linked by chemical valences wherein at least one of said blocks ("A" block) is soluble in the dispersion medium and at least another of said blocks ("B" block) is insoluble in the dispersion medium. The dispersing agent acts to disperse tapered copolymers hereinafter identified as 'C' copolymers, formed from conjugated dienes and vinyl aromatic monomers which are formed in the presence of the dispersing agent. The insoluble "B" block provides an anchor segment for attachment to the 'C' tapered copolymer, i.e. the tapered SBR polymer. The soluble "A" block of the dispersing agent provides a sheath around the otherwise insoluble copolymer and maintains the copolymeric product as numerous small discrete particles rather than an agglomerated or highly coalesced mass. The insoluble "B" block may, if desired, contain a plurality of pendent groups.

The dispersing agent of the present invention can be represented by the formula:

and the tapered copolymer is represented by "C"; wherein "A" is a hydrocarbon soluble block formed by the polymerization of 75 to 100% by weight of diene monomer and 0 to 25% by weight of vinyl aromatic hydrocarbon monomer, and "B" and "C" are identical representing tapered block copolymers having 30 to 70% by weight of vinyl aromatic hydrocarbon monomer contributed units and 30 to 70% by weight of diene monomer contributed units. Tapered blocks containing as low as 30% styrene content are dispersed in hydrocarbon solvents when made by the in situ dispersion taper process. The dispersed tapered block "B" and the tapered copolymers "C" are simultaneously formed during a semi-batch polymerization. In a semi-batch polymerization process, the monomers are metered into the reactor containing the "A" block and anionic initiator.

The soluble "A" block of the dispersing agent comprises about 1 to about 15% by weight of the total dispersion copolymer including the dispersing agent and the "C" tapered copolymer, i.e., the SBR-type tapered copolymer. The insoluble "B" block of the dispersing agent is prepared in situ during the polymerization of the SBR-type tapered copolymer, therefore the "B" block has the same composition as the "C" tapered copolymers, namely the SBR-type tapered copolymer formed during the dispersion copolymerization process. The total dispersion copolymer composition preferably contains about 2 to about 10% by weight of the soluble "A" block and about 90 to about 98% by weight of the insoluble "B" block and "C" copolymers, most preferably from 4 to 8% by weight of "A" and 92 to about 96% by weight of total "B" block and "C" copolymers. The number average molecular weights $M_n$ of each "A" block is preferably at least 500 and a maximum of 200,000, most preferably 1,000 to 50,000.

The number average molecular weights of each "B" block is the same as the 'C' copolymers or SBR-type random polymer, namely at least 20,000 and a maximum of 2,500,000, preferably 75,000 to 500,000.

While it is believed that the soluble "A" can be prepared from any monomer providing a soluble block in the dispersing medium subject to known anionic polymerization constraints, it is preferred that the soluble "A" block be selected from a polymer formed by polymerization of conjugated diene monomers or be selected from a copolymer formed by copolymerization of conjugated diene monomers and vinyl substituted aromatic monomers. The soluble "A" block is most preferably selected from a polymer or a copolymer formed from 75 to 100 parts by weight, preferably 75 to 98 parts, of conjugated diene monomer contributed units and 0 to 25 parts by weight, preferably 2 to 25 parts, of vinyl substituted aromatic monomer contributed units with all polymer or copolymer blocks being soluble in the hydrocarbon dispersion medium.

The insoluble "B" block is produced in the dispersion polymerization process during the formation of the tapered copolymer having the same composition as the tapered copolymer. The insoluble "B" block is anchored to the surface of or the outer layer of the copolymer particle by physical adsorption processes, as for example, by van der Waals forces. Therefore, its main criteria for success as an anchor is to be relatively immiscible in the dispersing medium. The "B" block can be prepared by the copolymerization of 30 to 70 parts by weight of conjugated diene monomer contributed units and 30 to 70 parts by weight of vinyl substituted aromatic monomer contributed units.

Diblock (A-B) dispersing agents are typically prepared utilizing monolithium anionic initiators. The use of dilithium anionic initiators promotes the production of triblock B-A-B dispersing agents. The dispersing agents prepared in situ and used in the preparation of the tapered SBR copolymers are recovered as a blend with the "C" copolymers, i.e. tapered SBR copolymers. The dispersing agents are prepared and present in an amount ranging from about 2 to 50%, preferably 5 to 35%, and most preferably 10 to 25% by weight of the total weight of the dispersion copolymer which includes the dispersing agent and the subsequently formed "C" tapered copolymer, i.e. tapered SBR copolymer.

The catalyst systems for use in preparing the tapered SBR copolymers and the dispersing agent are anionic initiators, preferably any organolithium catalyst known in the art as being useful in the polymerization of vinyl aromatic hydrocarbons and conjugated dienes. Suitable catalysts which initiate polymerization of the monomer system and dispersing agent include organolithium catalysts which have the formula $R(Li)_x$ wherein R represents a hydrocarbyl radical of 1 to 20, preferably 2–8, carbon atoms per R group, and x is an integer of 1–4, preferably 1 or 2. Typical R groups include aliphatic radicals and cycloaliphatic radicals, such as alkyl, cycloalkyl, cycloalkylalkyl, alkylcycloalkyl, aryl and alkylaryl radicals.

Specific examples of R groups for substitution in the above formula include primary, secondary and tertiary groups such as methyl, ethyl, n-propyl, isopropyl, n-butyl, isobutyl, t-butyl, n-amyl, isoamyl, n-hexyl n-octyl, n-decyl, cyclopentyl-methyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include: phenyllithium, naphthyllithium, 4-butylphenyllithium, p-tolyllithium, 4-phenylbutyllithium; 4-butylcyclohexyllithium, 4-cyclohexylbutyllithium, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5, 10,20-tetralithioeicosane, 1,2,4,6-tetralithiocyclohexane, 4,4'-dilithiobiphenyl, and the like.

Mixtures of different lithium catalysts can also be employed, preferably containing one or more lithium compounds such as $R(Li)_x$. The preferred lithium catalyst for use in the present invention is n-butyllithium.

Other lithium catalysts which can be employed are lithium dialkyl amines, lithium dialkyl phosphines, lithium alkyl aryl phosphines lithium diaryl phosphines and trialkyl tin lithium such as tributyl-tin-lithium.

Anionic initiators are typically employed in catalytically effective amounts ranging from 0.2 millimoles to 100 millimoles of anionic initiator per hundred grams of monomer in the reaction vessel. Approximately 1 to 10 mmole, preferably 0.2 to 5.0 mmole of anionic initiator per hundred grams of monomer is preferred for use in the present process.

All amounts of anionic initiator are indicated by hundred grams of monomer or by molar ratios of components in the instant invention and are considered to be catalytically effective amounts, that is, effective amounts for initiating and conducting polymerization of the dispersing agent and the disclosed monomer systems to produce copolymers of the present invention.

It is preferable to use 10 to 50% by weight of the total anionic initiator employed in the process to prepare the initial "A" block of the dispersing agent. The remaining portion of the initiator is then added to the reactor prior to sequential charging of the monomers to simultaneously produce both the "B" tapered block of the dispersing agent and the tapered copolymer from vinyl aromatic monomers and conjugated diene monomers.

Modifying agents such as ethers, tertiary amines, chelating ethers or amines, and sodium or potassium alkoxides or alkyls, may be added to increase the 1,2-addition reaction of the diene monomer in the SBR. Such modifying agents are well known in the art, such as tetrahydrofuran, tetramethylethylene diamine, diethylether, bis oxolanyl propane (OOPS), and the like, and these modifying agents may be employed in amounts generally ranging from 1:10 to 100:1 molar ratio of the modifier to anionic initiator. The 1,2-addition product can be increased from the 5 to 15% range to as high as 90% of the diene monomer units being incorporated into the "A" or "B" block of the dispersing agent and the "C" copolymer.

The preferred 1,2-vinyl content of the "B" tapered block and the "C" tapered copolymer, i.e. SBR produced in accordance with the process of the instant invention, ranges between 15 to 65% of the diene monomer contributed units. The 1,2-vinyl content in the diene contributed units of the "B" tapered block of the dispersing agent is identical to the desired final 1,2-vinyl content of the "C" tapered copolymer being produced herein.

The concentration of butadiene and styrene monomers utilized in such a nonaqueous dispersion polymerization reaction mixture can be varied from about 10 to about 50% by weight of monomers based upon the total reaction mixture. It is preferred to have a final polymer concentration ranging from 20 to 35% by weight based upon the total reaction mixture.

It is desirable to conduct this polymerization in an oxygen-free and moisture-free environment. For example, it is desirable to sparge the reaction mixture with dry nitrogen and to run the polymerization under a dry nitrogen atmosphere. The pressure in the reaction system during the polymerization generally is a function of the polymerization temperature, the monomer concentration, and the boiling point of nonaqueous dispersion medium. The polymerization pressure is preferably maintained within the range between 1.0 and 15 atmospheres.

The nonaqueous dispersion polymerization is conducted in a semi-batch process. As polymerization in the reactor is exothermic the reaction is typically conducted at 150° to 350°, preferably 200° to 300° F. with a residence time in the reactor of 0.3 to 6.0 hours preferably about 0.5–2.0 hours. The monomers are metered into the reactor containing the dispersion medium and an anionic initiator. The "A" block of the dispersing agent can either be metered into the reactor with the monomers or added to the reactor before the monomers are added or is preferably pre-made in the reactor prior to the metered addition of the monomers for the preparation of the tapered "B" block and "C" copolymer.

During the preparation of the taper "B" block and "C" copolymer, the monomer charge rate into the reactor is preferably constant. Tapering is controlled by changing the ratio of the diene and vinyl aromatic monomer charge rates. The percentage by weight of the vinyl aromatic monomer (VAM) in the overall monomer charge incrementally decreases from a maximum amount in a maximum charge range between about 50 to 100% by weight of the current total reactor monomer charge to a minimum amount in a minimum charge range between about of 0 to 30% by weight. The corresponding percentage of diene monomer by weight in the initial overall monomer charge during the charge cycle incrementally inversely changes from an initial charge ranging from 0 to 50% by weight of the overall monomer charge to a maximum charge ranging from 70 to 100% by weight. The overall average vinyl aromatic content of the tapered "B" block and tapered copolymers "C" produced according to the present invention is in the range of 30 to 70% by weight of the total monomer charge.

For purposes of this invention monomer charge is defined as the amount of monomer flowing into the reactor at a specific point in time. Thus, if X% represents the amount by weight percent of vinyl aromatic monomer, hereinafter discussed as styrene, of the total monomer charge being charged into the reactor, then (100−X)% represents the amount by weight percent of diene monomer charge, hereinafter discussed as butadiene, continuously being charged into the reactor in the formation of tapered styrene-butadiene block copolymers.

In a preferred embodiment of the present invention, the value of X % changes from a maximum charge between 60 to 100% to a minimum charge between 0 to 15%. By varying the weight ratio of butadiene to styrene in the reactor charge, the process of the present invention produces tapered styrene-butadiene copolymer so that the final recovered tapered styrene-butadiene copolymer contains 30 to 70% by weight of styrene or other vinyl aromatic monomer and possesses varying chain stiffness along the length of the polymer molecule and is suitable as an ideal rubber tread composition.

The present process incrementally changes the vinyl aromatic monomer to diene monomer feed ratio in the reactor while the modifier to initiator feed ratio in the reactor is either maintained as constant or is also adjusted during the course of the polymerization. The combination of polymerization temperature, flow rate, changing or constant modifier concentration, and changing vinyl aromatic monomer feed to diene monomer ratio results in a tapering styrene-butadiene copolymer.

The feed ratio of modifier to anionic initiator in the reactor can be incrementally increased to provide an increasing 1,2-microstructure percentage in diene contributed units along the backbone chain during the polymerization preferably in a molar ratio ranging between 0 and 5 moles of chelating modifier per mole of anionic initiator and between 0 to 400 moles of non-chelating modifier per mole of anionic initiator.

Process conditions such as the initial and maximum temperature of the polymerization reaction can independently affect the final 1,2-microstructure content of the 1,3-diene copolymers or polymers. These conditions can be controlled for each monomer reaction system to produce the final desired average 1,2-microstructure content of from about 10 to 90%. It is desirable to produce polymers and copolymers having an average 1,2-microstructure between 20 and 35% in the 1,3-diene monomer contributed units. In the production of tapered copolymers having a 30 to 40% by weight of vinyl aromatic monomer contributed units, the 1,2-microstructure content in the diene contributed units is preferably less than 25%, while tapered copolymers having higher percentages vinyl aromatic monomer contributed units may contain up to 90% of 1,2-microstructure. The 1,2-microstructure can also be constant by maintaining the modifier to anionic initiator molar ratio at a set value of 0 to 400.

The term 1,2-microstructure as used in the present invention actually refers to the mode of addition of a growing polymer chain with a conjugated diene monomer unit. Either 1,2-addition or 1,4-addition can occur. For simplicity, the terms vinyl content or 1,2-microstructure are employed to describe of conjugated dienes.

The total tapered block copolymer of the present invention can be represented by the structural formula (I):

$$(B_1/S_1-B_2/S_2\ldots B_n/S_n) \qquad (I)$$

wherein n ranges from 5 to 2500. This formula represents the ideal model of a tapered styrene-butadiene block copolymer formed during one full monomer charge cycle in the reactor. $B_1/S_1$ represents the initial block formed containing 50 to 100% by weight of styrene ($S_1$) and 50 to 0% by weight of butadiene ($B_1$). The percentage of styrene in each block gradually decreases such that % $S_1$>% $S_2\ldots$>% $S_n$; and the block of $B_n/S_n$ contains from 0 to 30% by weight of styrene and 70 to 100% by weight of butadiene, i.e. % $S_n$= between 0 to 30%, % $B_n$=70 to 100%, and (% $B_n$+% $S_n$)=100% of total monomer feed. The average percent by weight of vinyl aromatic monomer, preferably styrene, in the tapered copolymer must be between about 30 to 70%.

In a preferred embodiment, the diene monomer is 1,3-butadiene and the vinyl aromatic monomer is styrene. The copolymers prepared in accordance with the invention have molecular weights between 20,000 and 2,500,000, preferably between 75,000 and 500,000 and possess an average of 30 to 70% by weight of vinyl aromatic monomer contributed units and 30 to 70% of diene contributed units.

The charge of vinyl aromatic monomer, preferably styrene, into the reactor can also be maintained at decreasing charged amounts; thereby producing a tapered block copolymer having a decreasing styrene content or other vinyl aromatic monomer contributed content, while optionally tapering the 1,2-microstructure in accordance with the previously defined procedures. Thus the process of the present invention can be utilized to prepare tapered copolymers having: (1) both a tapered vinyl aromatic monomer content and a tapered 1,2-microstructure per sequential block formation or tapered vinyl aromatic monomer content and a constant 1,2-microstructure per sequential block formation.

Preferably, the diene monomer, vinyl aromatic monomer and modifier, if present, and initiator are added via separate feed streams into the polymerization reactor. The monomer ratios are varied through the course of the reaction while the modifier level can vary or be maintained. A rise in modifier level yields an increase in vinyl content and also aids in encouraging random addition of vinyl monomer in the tapered blocks of the copolymer. During the course of the polymerization it will generally be desirable to provide some form of agitation to the reaction mixture, such as stirring, shaking, or tumbling. A short stopping agent such as an alcohol may be employed to terminate the polymerization after the desired reaction time or at the desired percent conversion of monomers to copolymer. In general, the conversion of monomers into polymers is allowed to proceed to about completion. An appropriate antioxidant can be added at this stage of the process.

The nonaqueous dispersions formed in this polymerization process have a solids concentration ranging between about 10 to 50% by weight and are quite fluid. This fluidity permits greatly improved heat transfer as compared to the fluidity of solutions of SBR copolymers prepared using solution polymerization techniques. Due to the relative fluidity of these nonaqueous dispersions, both a higher molecular weight tapered polymer can be produced and the concentration of dispersed SBR tapered copolymers in the medium can be increased by 25 to 100% or more over the maximum allowable concentrations in solution polymerization techniques.

The elastomeric SBR tapered copolymer can be recovered from the hydrocarbon solvent by steam desolventization or by drum drying techniques thus providing energy savings due to higher solids levels. By proper control of particle size, the polymers can be recovered by filtration or centrifugation techniques.

The recovered tapered copolymer products, depending on their molecular weights and compositions, can be used for a variety of goods such as tires and various rubber molded products and for adhesive applications.

In the process of the present invention, SBR can be produced in a low viscosity dispersion having a styrene content as low as 30% by weight, since SBR's having a styrene content of 30 to 35% by weight are soluble in technical hexane, the present process enables one to utilize dispersion polymerization procedures at low styrene levels previously thought to be polymerizable only in solution. The present process also permits the production of higher styrene content tapered polymers in technical hexane without the occurrence of phase separation.

It is believed that one skilled in the art can, using the preceding description, utilize the present invention to its fullest extent. The following preferred specific embodiments are, therefore, to be construed as merely illustrative of the catalyst system and the polymerization process of the present invention. All percentages identified in the examples are by weight unless otherwise indicated.

EXAMPLE 1

Preparation of "A" Block of Dispersing Agent

A 20 gallon heated jacket reactor was charged with 30.5 lb. hexane. The reactor was vented and agitated. The reactor was charged with 0.38 cc. of OOPS modifier, 3.2 lb. of 24.65% of 1,3 butadiene in hexane, and 0.36 lb. of 25.2% of styrene in hexane. The reactor jacket temperature was set at 200° F. and when the reaction mix reached 170° F. the reactor was additionally charged with 36 cc. (24 g) of 3% n-butyllithium in hexane. The reactor was maintained at approximately 170° F. for ten minutes, thereby polymerizing the charged monomers to produce the "A" block of the dispersing agent.

Preparation of "B" Taper Block of Dispersing

Agent and "C" Tapered Copolymer

The reactor containing the "A" block is charged with 108 cc. (71 g) of 3% n-butyllithium and thereinafter streams of 24.65% of 1,3-butadiene in hexane at 0.026 lb/min and 25.2% of styrene in hexane at 0.234 lb/min. Every 20 minutes the butadiene stream was increased an additional 0.0508 lb/min and the styrene stream was correspondingly decreased by 0.0468 lb/min until a total of 18.3 lb. of the butadiene stream and 14.1 lb. of the styrene stream were charged. Polymerization was terminated by the addition of isopropanol and agitation was continued for 20 minutes. A antioxidant (54 g. BHT) and 100 cc. of water were added and the polymer dispersion was mixed for 30 minutes, cooled and recovered. The charge parameters are displayed in Table I. The properties of the recovered tapered copolymer are displayed in Table II. This process produced a block taper structure with n=6 in structural formula (1).

EXAMPLES 2 to 6

The dispersion tapered copolymers of Examples 2 to 6 were prepared in accordance with the procedure of Example 1 utilizing the reactant charge parameters displayed in Table I yielding A-B block dispersing agents and tapered copolymers having properties displayed in Table II.

EXAMPLE 7

A one gallon reactor was charged with 0.5 lb hexane, 3 g of styrene in hexane, 27 g of 1,3-butadiene and 0.5 mmole of a dilithium compound made from a molar reaction 1.1 of one mole of 1,3-diisopropenyl benzene, two moles of s-butyllithium and two moles of triethylamine ($Et_3N$). The mixture was reacted for 15 minutes at 200° F. to produce an "A" block.

Subsequently, 4.5 mmole Di-Li-$2Et_3N$ was charged into the reactor, 2.42 lb. of 24.7% solution of a 1,3-butadiene in hexane blend was charged to a pressurized tank and 1.21 lb of 33% solution of styrene in hexane and 0.4 lb of hexane was charged to a stirred tank. The styrene in hexane blend was charged into the reactor over a 90 minute period. Simultaneously, the butadiene in hexane blend was charged into the stirred tank containing styrene in hexane over a 85 minute period. The monomer blend entering the polymerization reactor at 200° F., was composed of a continuously decreasing styrene concentration and a continuously increasing 1,3-butadiene concentration, resulting in a steadily changing composition along the polymer chain.

The reaction was terminated with 5.0 mmole tributyl-SnCl. An excellent dispersion of low viscosity was obtained.

The recovered polymer has a ML-4 at 100° C. of 51, a Mn of 155,400, a Mw/Mn of 1.58, a 9.5% vinyl content (butadiene =100), a 31.2% styrene content, and a 3.4% block styrene content (styrene=100).

TABLE I

| Example No. | 1 | 2 | 3 | 4 | 5 |
|---|---|---|---|---|---|
| BLOCK "A" CHARGES | | | | | |
| OOPS (cc) | 0.38 | 0.32 | 0.32 | — | — |
| 24.65% Butadiene in Hexane (lb) | 3.20 | 3.20 | 3.20 | 3.20 | 3.20 |
| 25.2% Styrene in Hexane (lb) | 0.36 | 0.36 | 0.36 | 0.36 | 0.36 |
| 3% n-BuLi in Hexane (cc) | 36 (24 g) | 31 (20 g) | 31 (20 g) | 9.3* | 31 (20 g) |
| "B" BLOCK - "C" COPOLYMER CHARGES | | | | | |
| 3% n-BuLi in Hexane (cc) | 108 (71 g) | 93 (61 g) | 93 (61 g) | 28* | 93 (61 g) |
| Polymerization Temp., °F. | 212 | 208 | 216 | 214 | 216 |
| Initial Metering Rate (lb/min) | | | | | |
| 24.65% Butadiene/Hexane | 0.026 | 0.100 | 0.087 | 0.021 | 0.021 |
| 25.20% Styrene/Hexane | 0.234 | 0.234 | 0.204 | 0.186 | 0.186 |
| Monomer Charge Taper Rate (lb/min) | | | | | |
| Butadiene | 0.050800 | 0.096000 | 0.000113 | 0.000220 | 0.000230 |
| Styrene | −0.046800 | −0.021300 | −0.001430 | −0.000132 | −0.000132 |
| Metering Time | 122 min. | 122 min. | 122 min. | 123 min. | 120 min. |
| Time Increment Between Monomer Taper Rate Change | 20 min. | 10 min. | 5 sec. | 5 sec. | 5 sec. |
| Total Monomer and Hexane Charge (lb) | | | | | |
| Butadiene | 18.3 | 18.3 | 20.1 | 21.2 | 21.2 |
| Styrene | 14.1 | 14.0 | 12.3 | 11.2 | 11.2 |

*1 molar DiLi.2Et$_3$N

TABLE II

| Example No. | 1 | 2 | 3 | 4 | 5 |
|---|---|---|---|---|---|
| Mod/Li | 0.05 | 0.05 | 0.05 | 0.00 | 0.00 |
| % 'A' Block | 10 | 10 | 10 | 10 | 10 |
| % 'A' Initiator | 25 | 25 | 25 | 25 | 25 |
| % Total Solids | 18 | 18 | 18 | 18 | 18 |
| % Conversion | 99.1 | 99.8 | 99.5 | 99.0 | 98.6 |
| Mooney | 40 | 42 | 44 | 56 | 44 |
| % Styrene | 39.3 | 38.8 | 34.4 | 31.2 | 31.5 |
| % Block Styrene | 29.9 | 11.3 | 14.2 | 7.3 | 6.2 |
| % Vinyl | 17.4 | 17.0 | 16.4 | 10.3 | 8.6 |
| Mn | 102756 | 112027 | 167984 | 150401 | — |
| Mw/Mn | 1.28 | 1.23 | 1.20 | 1.53 | — |

We claim:

1. A process for the preparation of a tapered copolymer having no sharply defined glass transition temperature and having 30 to 70% by weight of vinyl aromatic contributed units and 30 to 70% by weight of diene monomer contributed units in a hydrocarbon dispersing medium comprising the following steps:

(1) injecting into a reactor a charge of 75 to 100% by weight of a diene monomer, 0 to 25% by weight of a vinyl aromatic hydrocarbon monomer and a catalytically effective amount of an anionic initiator in a hydrocarbon dispersing medium;

(2) polymerizing the charge of step (1) to form a preformed block of a dispersing agent, the preformed block being soluble in the hydrocarbon dispersing medium;

(3) injecting into the reactor a charge of:
      (a) a vinyl aromatic hydrocarbon monomer,
      (b) a conjugated diene monomer, and
      (c) an additional charge of an anionic initiator wherein during the course of the dispersion polymerization process the percent by weight of the diene monomer being charged into the reactor is (100-X) %, wherein X% represents the weight percent of the vinyl aromatic hydrocarbon monomer being charged into the reactor and wherein X % incrementally varies between a maximum charge between about 100 to 50% and a minimum charge between about 0 to 30% to produce:
      (I) a block copolymer dispersing agent consisting of the preformed block and a block formed in situ during step (3) and
      (ii) a tapered copolymer having no sharply defined glass transition temperature and having vinyl aromatic hydrocarbon monomer contributed units ranging from about 30 to 70% by weight.

2. The process as defined in claim 1 wherein the conjugated diene monomer is 1,3-butadiene.

3. The process as defined in claim 1 wherein the vinyl aromatic monomer is styrene.

4. The process as defined in claim 1 wherein the hydrocarbon dispersing medium comprises hexane.

5. The process as defined in claim 1 wherein the hydrocarbon dispersing medium comprises at least 60% hexane.

* * * * *